(12) United States Patent
Liao et al.

(10) Patent No.: US 6,729,221 B2
(45) Date of Patent: May 4, 2004

(54) SCROLL SAW CAPABLE OF SAWING ANGLE ADJUSTMENT

(76) Inventors: Juei-Seng Liao, No. 295, Sec. 1, Nanking E. Rd., Taichung City (TW); Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/191,224

(22) Filed: Jul. 9, 2002

(65) Prior Publication Data

US 2003/0213353 A1 Nov. 20, 2003

(30) Foreign Application Priority Data

May 15, 2002 (TW) ..................... 91206938 U

(51) Int. Cl.7 ................................ B27B 19/02
(52) U.S. Cl. ............................ 83/781; 83/581
(58) Field of Search .................. 83/781, 783, 784, 83/785, 786, 581, 477.1, 471.3, 473

(56) References Cited

U.S. PATENT DOCUMENTS

| | | | | |
|---|---|---|---|---|
| 76,730 A | * | 4/1868 | Demming | 83/781 |
| 2,780,249 A | * | 2/1957 | Andreae et al. | 83/781 |
| 5,228,376 A | * | 7/1993 | Huang | 83/781 |
| 5,327,807 A | * | 7/1994 | Chang | 83/783 |
| 5,351,591 A | * | 10/1994 | Miyamoto et al. | 83/781 |
| 5,540,130 A | * | 7/1996 | Huang et al. | 83/781 |

* cited by examiner

Primary Examiner—Stephen Choi
(74) Attorney, Agent, or Firm—Ladas & Parry

(57) ABSTRACT

A scroll saw includes a work platform, a C-shaped frame, a blade unit, a blade holder unit, a motor unit, a transmission unit, a pivot unit, and a locking unit. The C-shaped frame has upper and lower frame portions disposed above and below a top side of the work platform. The blade unit has blade ends retained on the blade holder unit. The motor unit drives the blade holder unit via the transmission unit for moving the blade unit to reciprocate relative to the work platform. The pivot unit mounts pivotally the C-shaped frame on the work platform about a pivot axis in the longitudinal direction, thereby permitting sawing angle adjustment. The locking unit locks releasable the C-shaped frame to the work platform so as to arrest pivoting movement of the C-shaped frame relative to the work platform.

6 Claims, 15 Drawing Sheets

US 6,729,221 B2

SCROLL SAW CAPABLE OF SAWING ANGLE ADJUSTMENT

CROSS-REFERENCE TO RELATED APPLICATION

This application claims priority of Taiwanese application no. 091206938, filed on May 15, 2002.

BACKGROUND OF THE INVENTION

1. Field of the Invention

The invention relates to a scroll saw, more particularly to a scroll saw capable of sawing angle adjustment.

2. Description of the Related Art

Referring to FIGS. 1, 2 and 3, a conventional scroll saw 10 is shown to include a work platform 11, a hollow C-shaped frame 12, a work table 17, a blade unit 166, a blade holder unit 14, a motor unit 13, a transmission unit 15, and a sawing angle adjusting unit 18.

The work platform 11 extends in a longitudinal direction, and has a first end 111 and a second end 112 opposite to the first end 111 in the longitudinal direction. A table support block 113 extends uprightly from the second end 112, and is formed with a pivot hole 114.

The C-shaped frame 12 has an upper frame portion 122, and a lower frame portion 123 mounted fixedly on the work platform 11. The lower frame portion 123 is formed with a pivot hole 121 that is aligned with the pivot hole 114 in the table support block 113.

The work table 17 is disposed on top of the work platform 11, and is formed with a blade slot 171 and a pivot pin 172 inserted into the pivot hole 121.

The blade unit 166 passes through the blade slot 171 in the work table 17, and has upper and lower blade ends.

The blade holder unit 14 includes upper and lower blade holder arms respectively extending above and below the work table 17, and connected to a respective one of the upper and lower blade ends and to a respective one of the upper and lower frame portions 122, 123 of the C-shaped frame 12.

The motor unit 13 is mounted in the C-shaped frame 12. The transmission unit 15 interconnects the motor unit 13 and the blade holder unit 14 to drive the blade holder unit 14 for moving the blade unit 166 to reciprocate relative to the work table 17 to cut a work piece (not shown) on the work table 17.

The sawing angle adjusting unit 18 includes a sawing angle adjusting plate 181 that is mounted on the bottom side of the work table 17. The adjusting plate 181 is formed with a curved slot 1811, angle indica adjacent to the curved slot 1811, and a pivot pin 182 inserted into the pivot hole 114 in the table support block 113. The adjusting unit 18 further includes a threaded fastener 183 extending through the curved slot 1811 and threadedly engaging the table support block 113.

Referring further to FIG. 4, if the work piece is to be cut at an angle, the angle formed between the blade 166 and the work table 17 must be adjusted. To this end, the fastener 183 is first operated to loosen the work table 17 from the work platform 11. A force is then exerted on the work table 17 so as to pivot both the work table 17 and the sawing angle adjusting plate 181 about the pivot pins 172, 182. Upon adjustment to the desired angle, the fastener 183 is once again operated to clamp the adjusting plate 181 against the table support block 113.

The following are some of the drawbacks of the conventional scroll saw 10:

1. Since the sawing angle adjusting unit 18 is located under the work table 17, sawing angle adjustment and reading of the angle indica are inconvenient to conduct.
2. Because the work piece tilts with the work table 17, it is not easy to control the position of the work piece during the sawing operation, thereby resulting in poor work quality and efficiency.

SUMMARY OF THE INVENTION

Therefore, the main object of the present invention is to provide a scroll saw that can overcome the aforesaid drawbacks of the prior art.

Accordingly, the scroll saw of the present invention includes:

a work platform having a top side extending and defining a center line in a longitudinal direction and formed with a blade slot transverse to the longitudinal direction;

a C-shaped frame having upper and lower frame portions disposed above and below the top side of the work platform, respectively;

a blade unit passing through the blade slot in the work platform and having upper and lower blade ends;

a blade holder unit including upper and lower blade holder arms respectively extending above and below the top side of the work platform, and connected to a respective one of the upper and lower blade ends and to a respective one of the upper and lower frame portions;

a motor unit mounted on the work platform;

a transmission unit interconnecting the motor unit and the blade holder unit to drive the blade holder unit for moving the blade unit to reciprocate relative to the work platform;

a pivot unit for mounting pivotally the C-shaped frame on the work platform about a pivot axis parallel to the center line, thereby permitting sawing angle adjustment; and a locking unit for locking releasable the C-shaped frame to the work platform so as to arrest pivoting movement of the C-shaped frame relative to the work platform, thereby permitting retention of the C-shaped frame at a desired sawing angle.

BRIEF DESCRIPTION OF THE DRAWINGS

Other features and advantages of the present invention will be come apparent in the following detailed description of the preferred embodiments with reference to the accompanying drawings, of which.

DETAILED DESCRIPTION OF THE PREFERRED EMBODIMENTS

Figure 1:
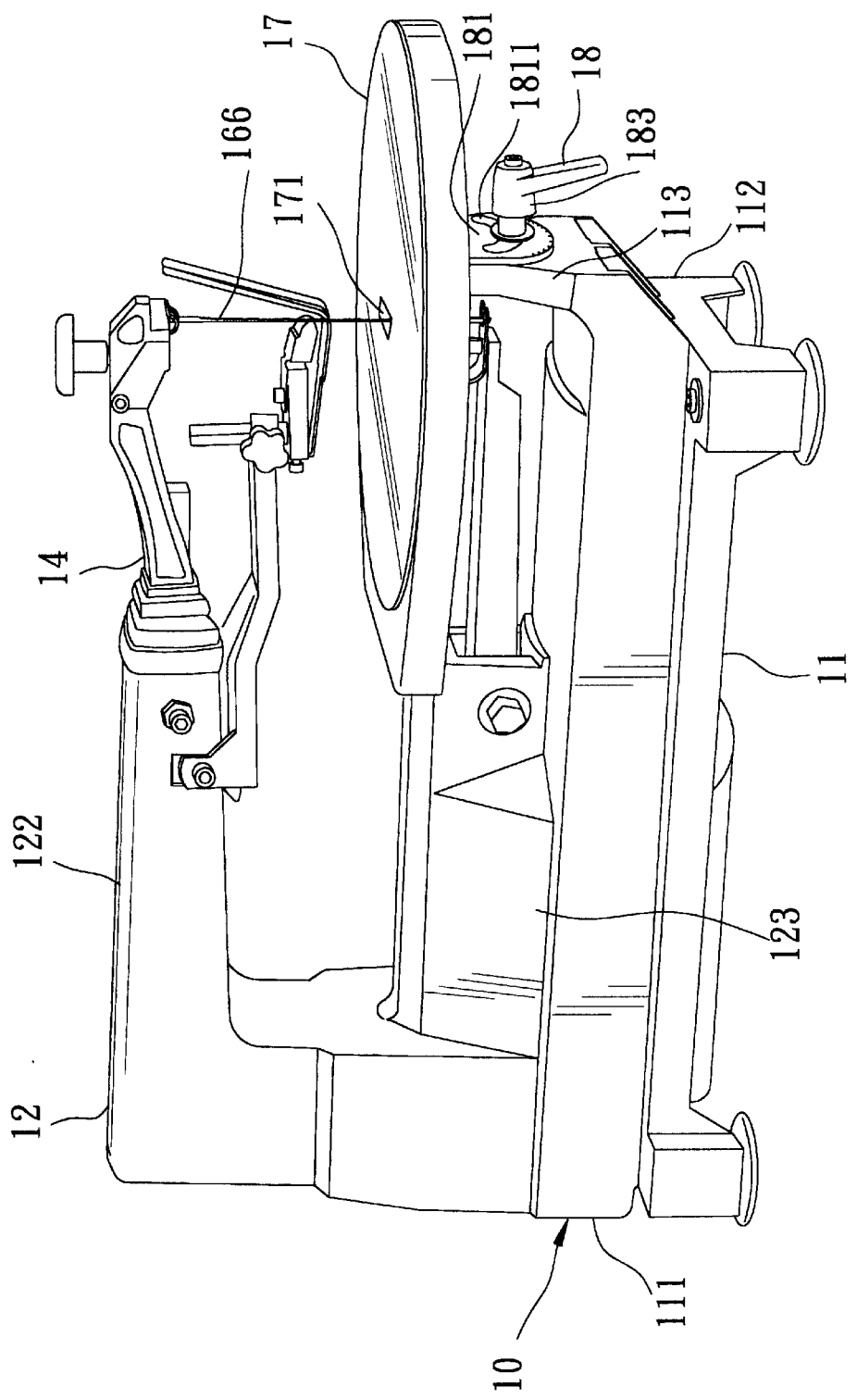
FIG. 1 is a perspective view of a conventional scroll saw.
Figure 2:
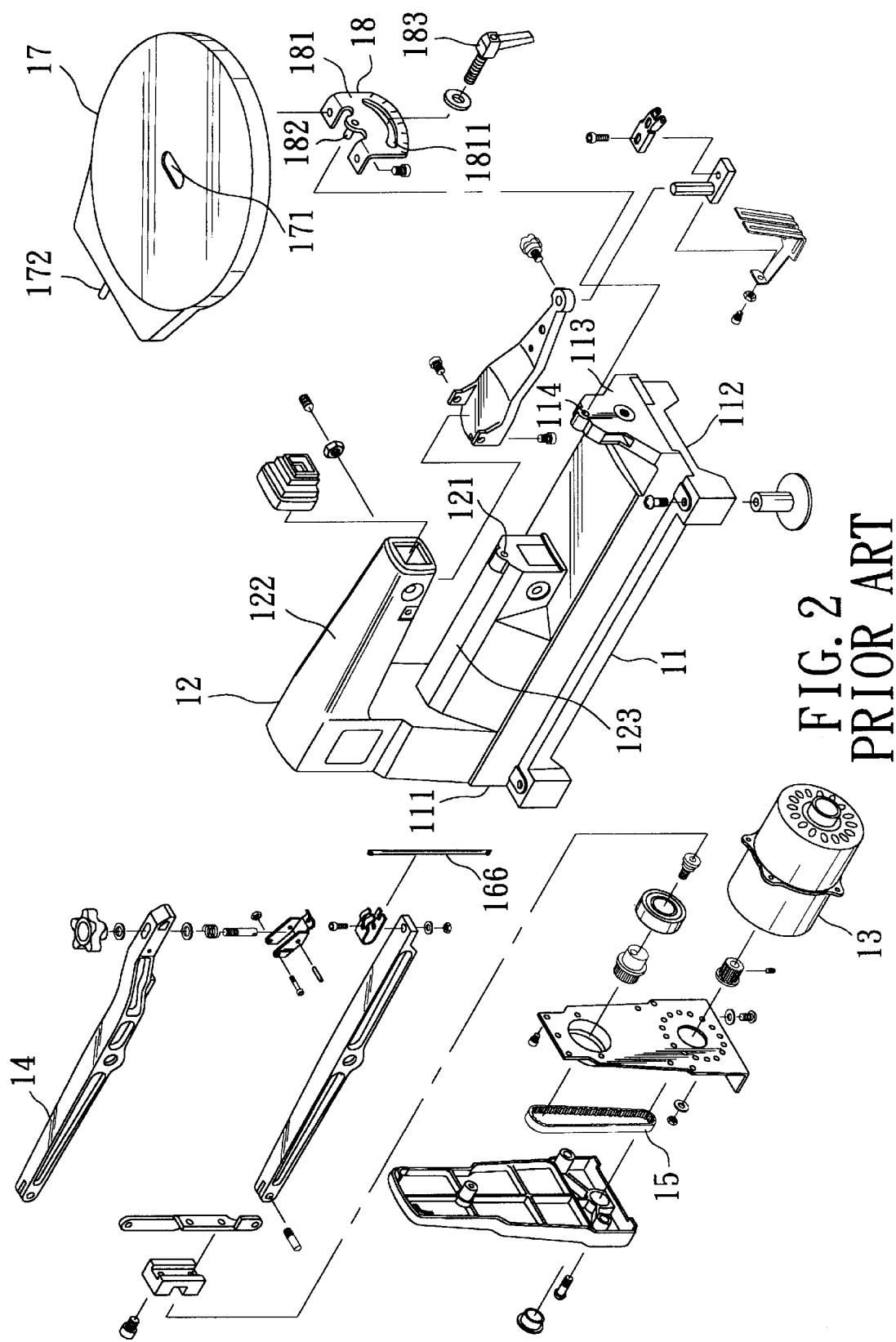
FIG. 2 is an exploded perspective view of the conventional scroll saw of FIG. 1.
Figure 3:
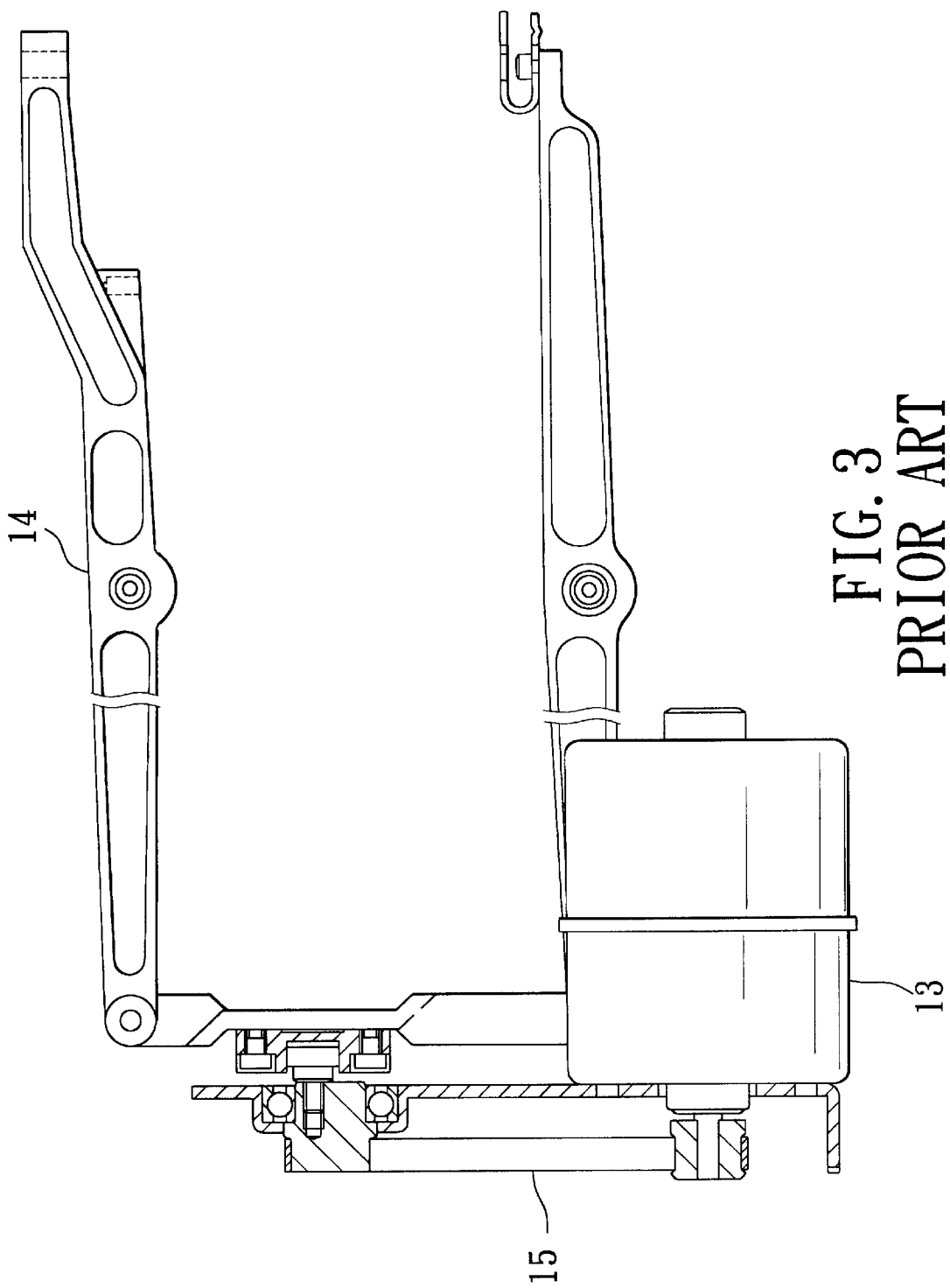
FIG. 3 is a fragmentary partly sectional schematic view illustrating how a transmission unit interconnects a motor unit and a blade holder unit in the conventional scroll saw of FIG. 1.
Figure 4:
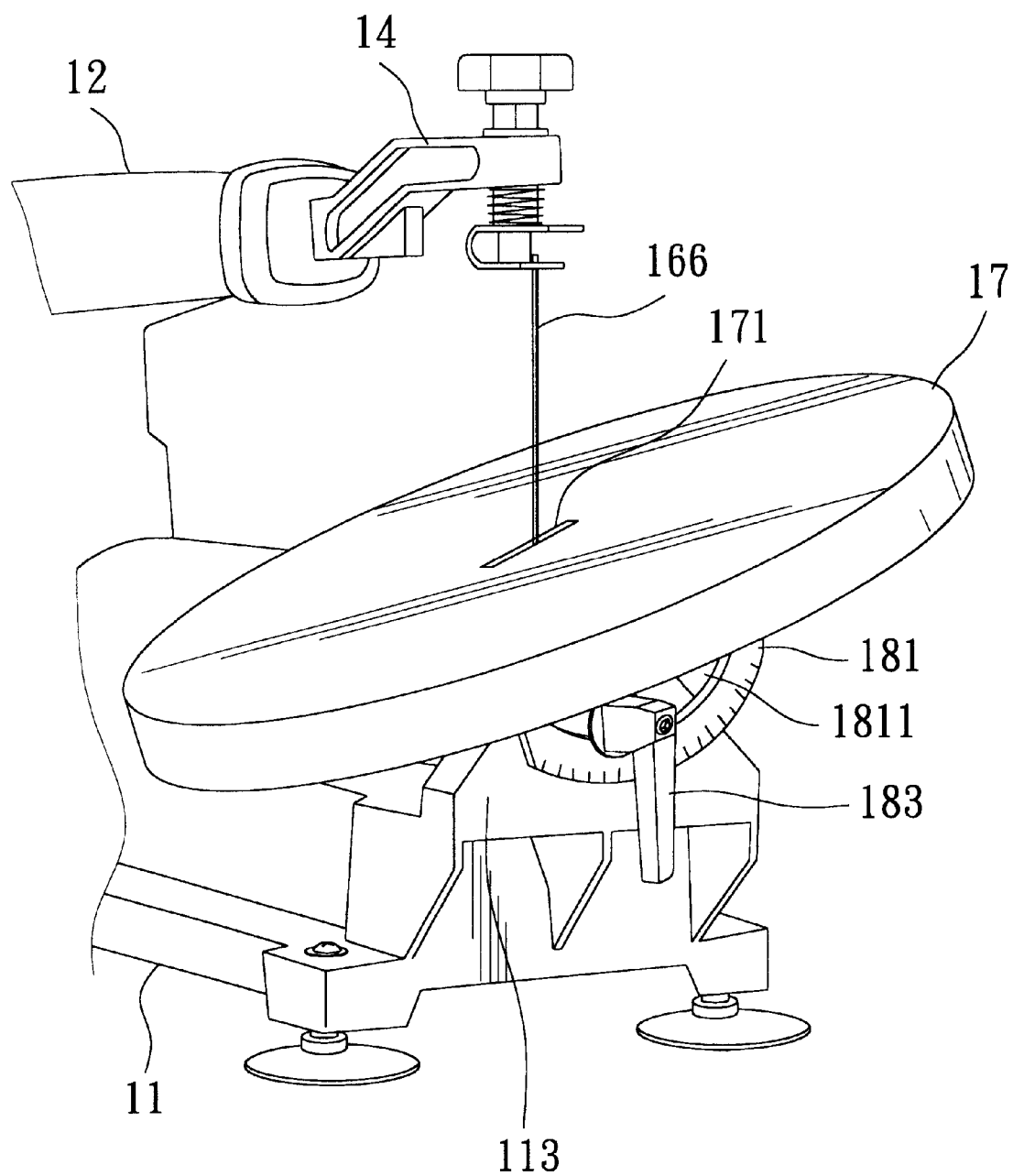
FIG. 4 is a fragmentary perspective view illustrating how a sawing angle of the conventional scroll saw of FIG. 1 is adjusted.
Figure 5:
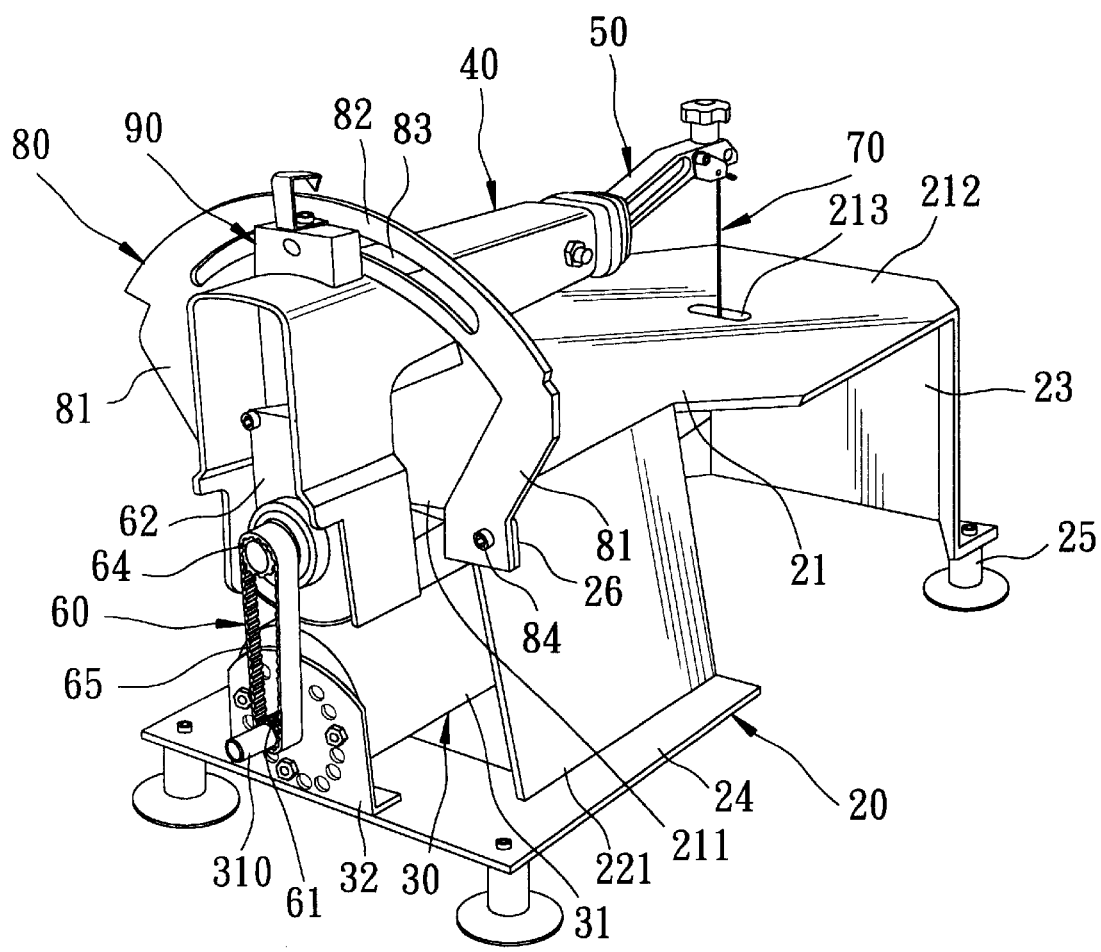
FIG. 5 is a rear perspective view of the first preferred embodiment of a scroll saw according to the present invention.
Figure 6:
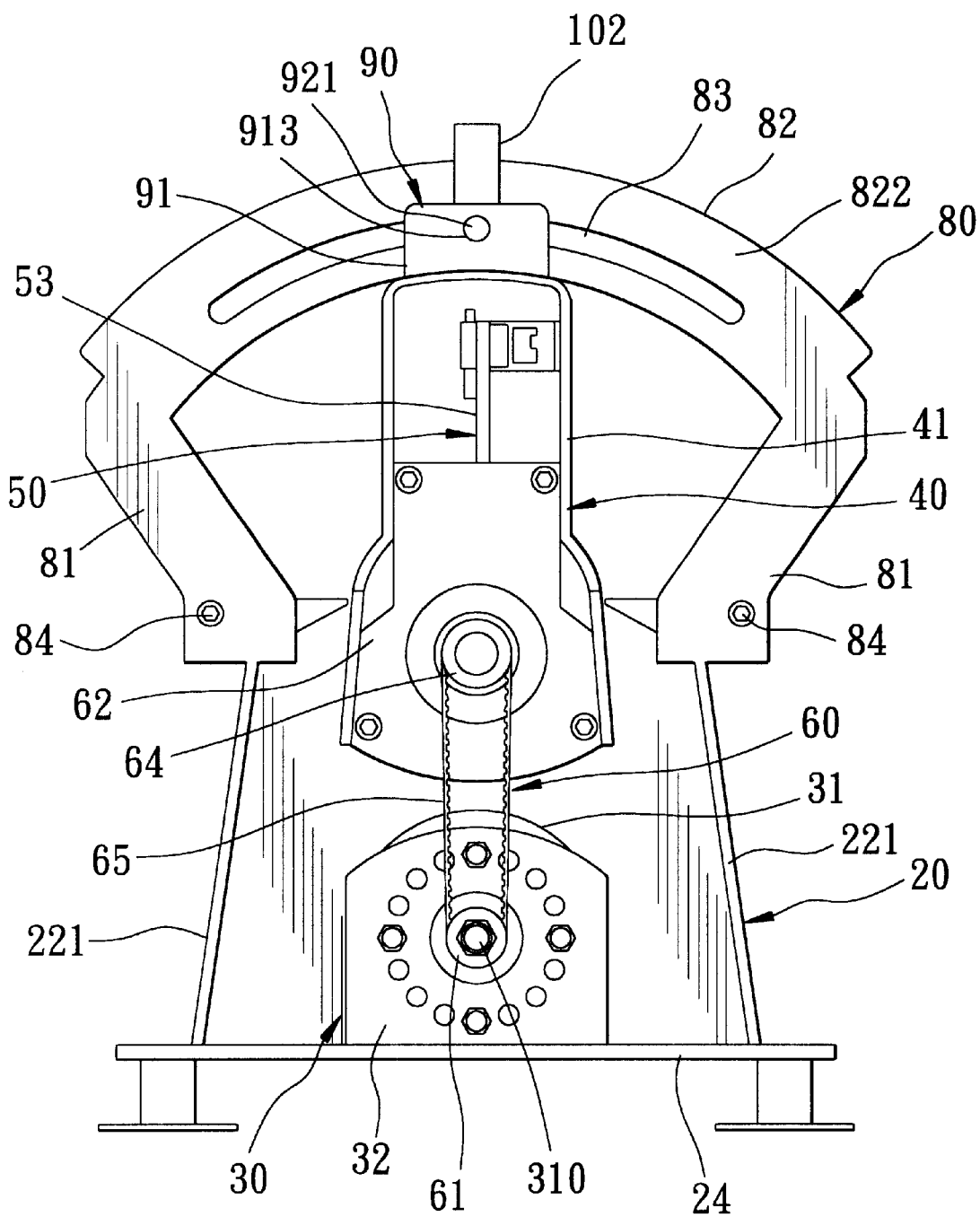
FIG. 6 is a rear schematic view of the first preferred embodiment.
Figure 7:
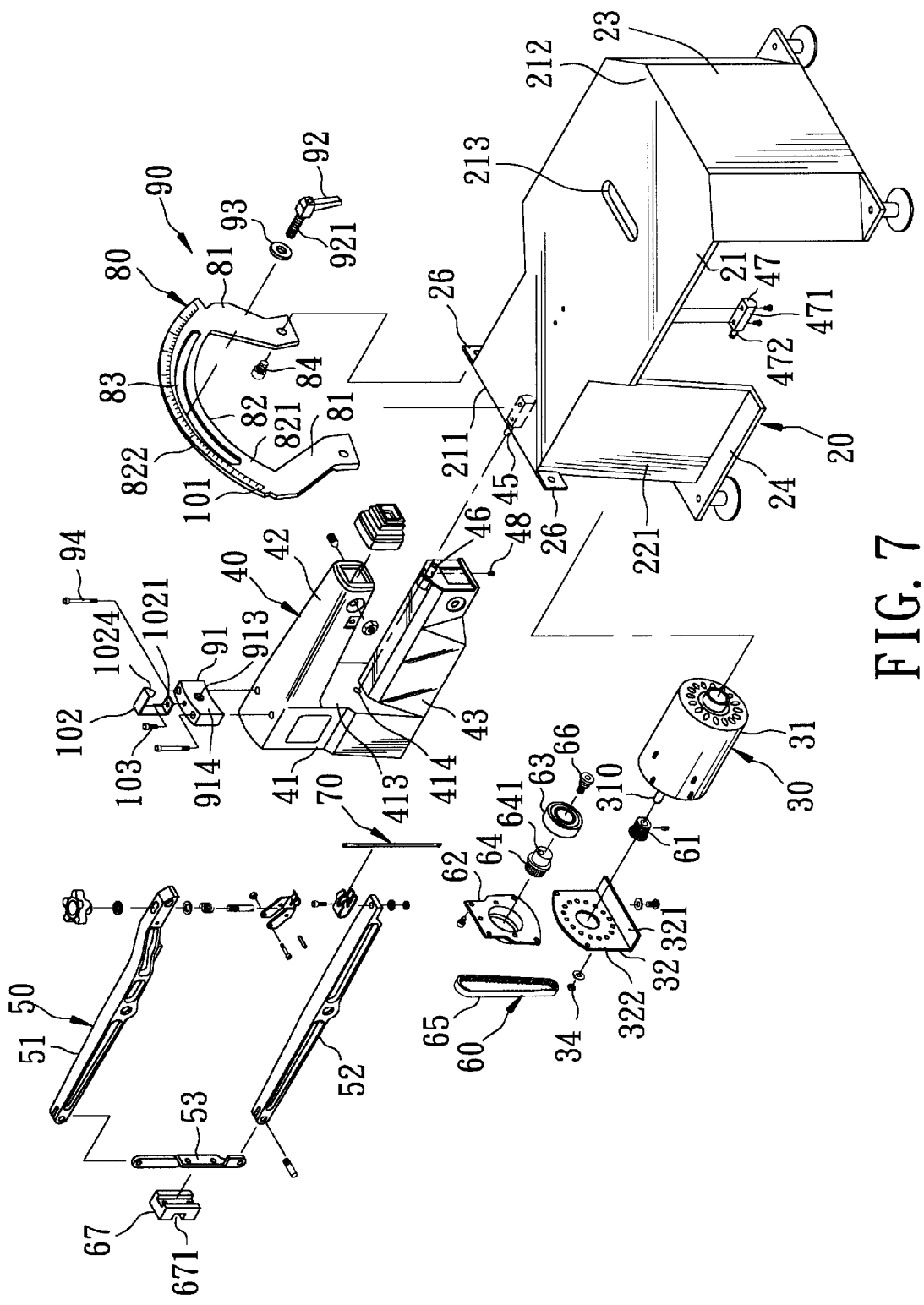
FIG. 7 is an exploded perspective view of the first preferred embodiment of a scroll saw according to the present invention.

Referring to FIGS. 5, 6 and 7, the first preferred embodiment of a scroll saw according to this invention is shown to include a work platform 20, a hollow C-shaped frame 40, a blade unit 70, a blade holder unit 50, a motor unit 30, a transmission unit 60, a pivot unit 44 (see FIG. 8), and a locking unit 90.

The work platform 20 includes a top plate 21 that is formed with a top side extending and defining a center line and that has a first end 211 and a second end 212 opposite to the first end 211 in a longitudinal direction. The top plate 21 is formed with a blade slot 213 transverse to the longitudinal direction. Two lateral plates 221 are spaced apart in the transverse direction and extend downwardly from and cooperate with the top plate 21 to form a mounting space there among. A front plate 23 extends downwardly from the second end 212 of the top plate 21. A bottom plate 24 is disposed opposite to the top plate 21 and interconnects the lateral plates 221. Engaging members 26 extend respectively from the lateral plates 221 at a junction with the top plate 21. The top plate 21 serves as a work table for placing a work piece (not shown) thereon.

The C-shaped frame 40 includes upper and lower frame portions 42, 43 disposed above and below the top plate 21 of the work platform 20, respectively. A connecting frame portion 41 interconnects the upper and lower frame portions 42, 43, and includes a connecting plate 413 formed with a pivot hole 414. The lower frame portion 42 extends into the mounting space of the work platform 20, and is provided with a pivot sleeve unit 46 aligned with the pivot hole 414 along a pivot axis parallel to the center line of the top plate 21.

The blade unit 70 passes through the blade slot 213 in the top plate 21, and has upper and lower blade ends.

The blade holder unit 50 is conventional in construction and includes upper and lower blade holder arms 51, 52 respectively extending above and below the top plate 21 of the work platform 20, and connected to a respective one of the upper and lower blade ends and to a respective one of the upper and lower frame portions 42, 43. The blade holder unit 50 further includes a link 53 pivotably connected to the upper and lower blade holder arms 51, 52.

The motor unit 30 includes a motor 31 having a transmission axle 310, and a motor seat 32. The motor seat 32 has a mounting portion 321 mounted on the bottom plate 24 of the work platform 20, and a motor supporting portion 322 extending from and transverse to the mounting portion 321 for mounting the motor 31 thereon.

The transmission unit 60 is conventional in construction and interconnects the motor unit 30 and the blade holder unit 50 in a known manner to drive the blade holder unit 50 for moving the blade unit 70 to reciprocate relative to the work platform 20. The transmission unit 60 includes a primary transmission wheel 61 mounted on the transmission axle 310, an axle bearing seat 62 mounted on the connecting frame portion 41 of the C-shaped frame 40 for retaining an axle bearing 63, a secondary transmission wheel 64 connected to the axle bearing 63 and formed with an eccentric threaded hole 641, a transmission belt 65 trained on the primary and secondary transmission wheels 61, 64, a drive member 66 mounted on the secondary transmission wheel 64 at the eccentric threaded hole 641, and a coupling block 67 formed with a retaining groove 671 for receiving the drive member 66. The coupling block 67 is mounted on the link 53 of the blade holder unit 50.

Figure 8:
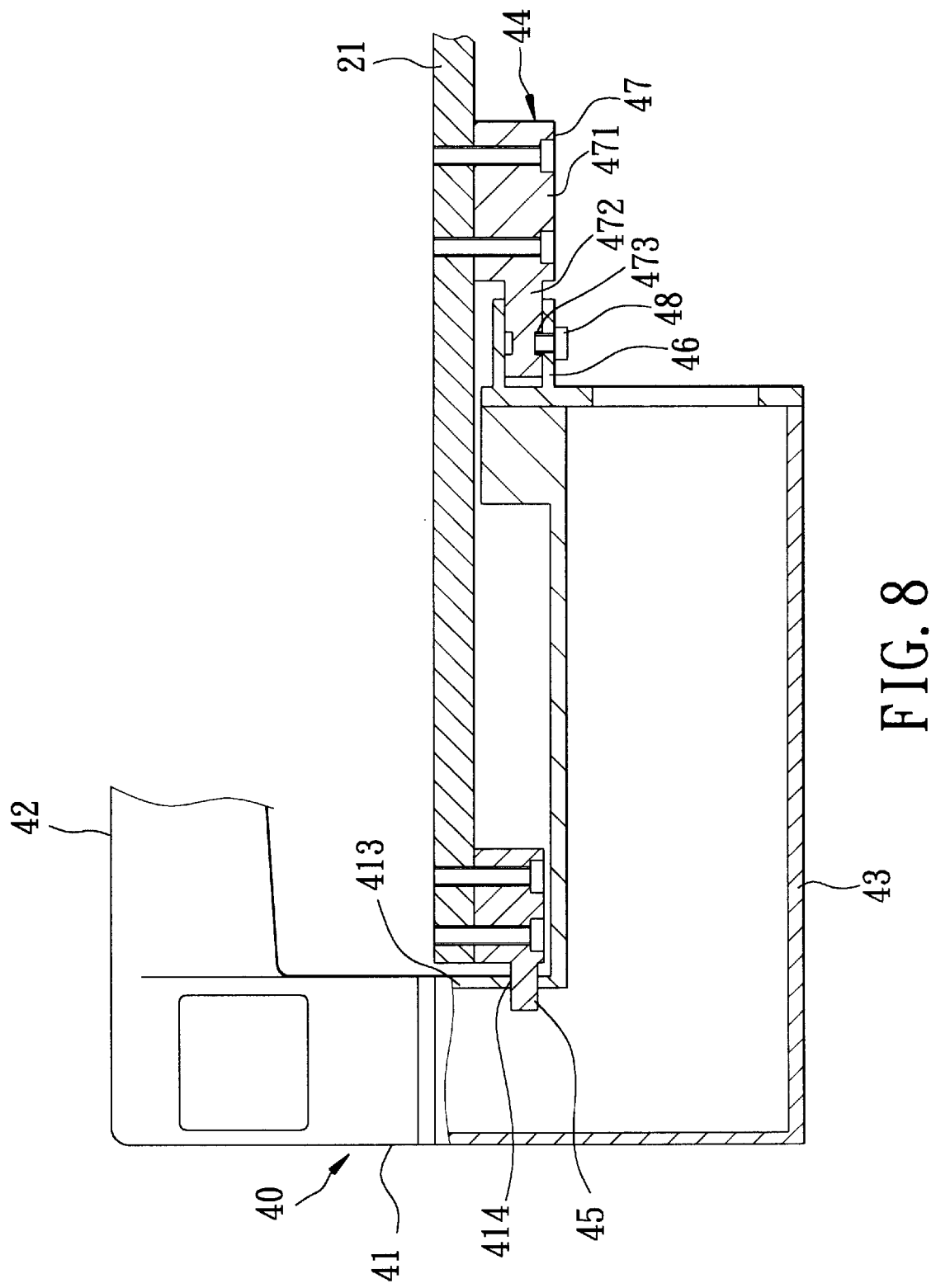
FIG. 8 is a fragmentary partly sectional schematic view of the first preferred embodiment for illustrating how a C-shaped frame is mounted pivotally on a work platform.

The pivot unit 44 is used for mounting pivotally the C-shaped frame 40 on the work platform 20 about the pivot axis, which is parallel to the center line, thereby permitting sawing angle adjustment. With further reference to FIG. 8, the pivot unit 44 includes first and second pivot pin units 45, 47 mounted on a bottom side of the top plate 21, aligned in the longitudinal direction, and spaced apart from each other in the longitudinal direction. The pivot hole 414 in the C-shaped frame 40 pivotally engages the first pivot pin unit 45. The second pivot pin unit 47 includes a mounting block 471 and a pivot rod 472 extending from the mounting block 471 and toward the first pivot pin unit 45. The pivot sleeve unit 46 on the lower frame portion 43 pivotally engages the pivot rod 472 of the second pivot unit 47. The pivot rod 472 of the second pivot pin unit 47 is formed with an annular groove 473. The pivot sleeve unit 46 on the lower frame portion 43 is formed with a radial fastener hole registered with the annular groove 473. The pivot unit 44 further includes a fastener 48 engaging the fastener hole in the pivot sleeve unit 46 and extending into the annular groove 473 to arrest movement of the C-shaped frame 40 in the longitudinal direction relative to the work platform 20.

Figure 9:
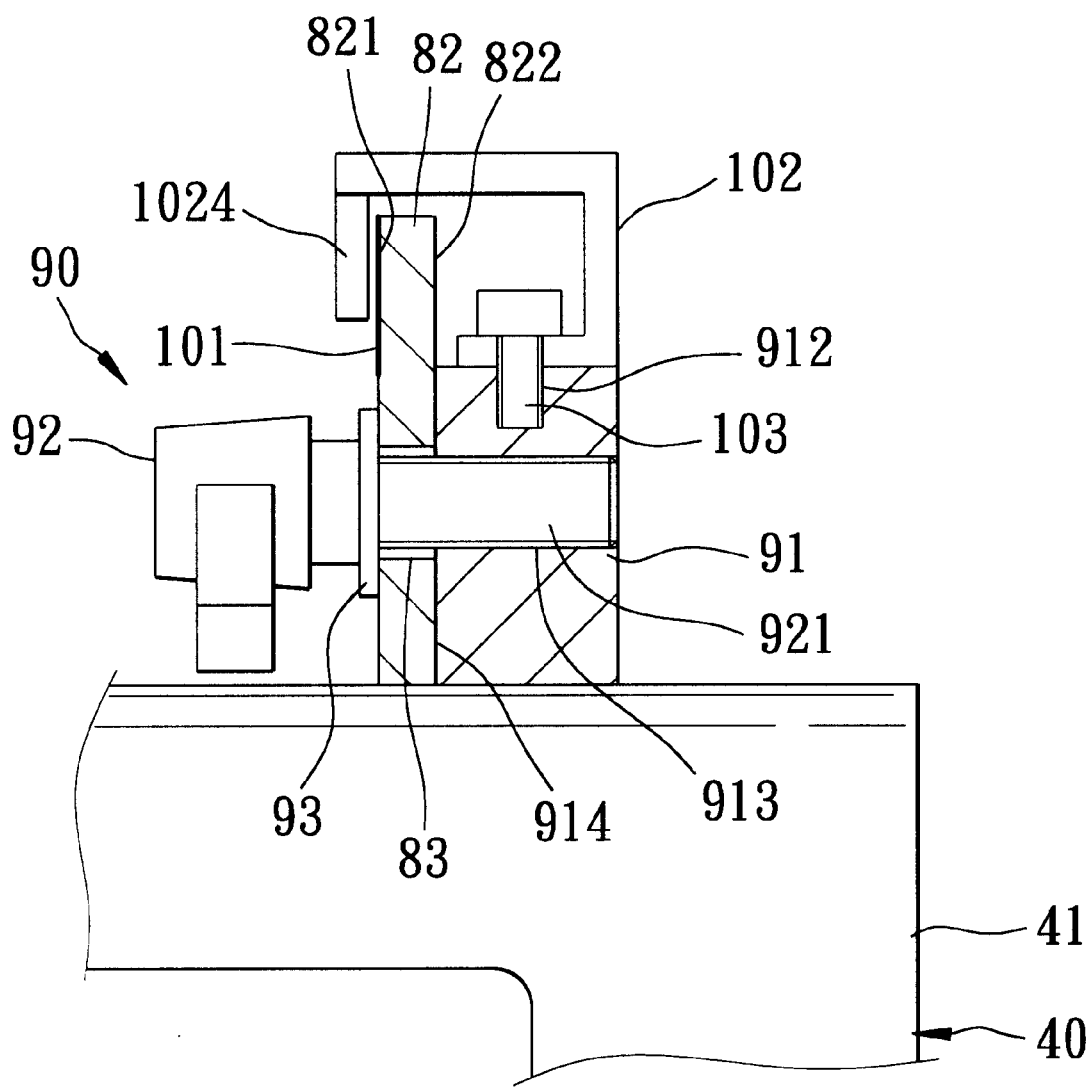
FIG. 9 is a fragmentary partly sectional schematic view of the first preferred embodiment for illustrating a locking unit in a clamping state.

The locking unit 90 is used for locking releasable the C-shaped frame 40 to the work platform 20 so as to arrest pivoting movement of the C-shaped frame 40 relative to the work platform 20, thereby permitting retention of the C-shaped frame 40 at a desired sawing angle. Referring further to FIG. 9, the locking unit 90 includes a generally inverted U-shaped retaining plate 80 that has a pair of mounting arms 81 disposed on opposite sides of the C-shaped frame 40 and secured to the engaging members 26 of the work platform 20 via a pair of fasteners 84, and a curved bridging portion 82 interconnecting the mounting arms 81 and disposed above the upper frame portion 42. The bridging portion 82 is formed with a curved slot 83 having a curvature centered at the pivot axis, and has a surface 821 facing the blade unit 70 and a surface 822 opposite to the surface 821. The locking unit 90 further includes an anchoring block 91 mounted on the upper frame portion 42 adjacent to the surface 822 of the bridging portion 82 of the retaining plate 80 via a pair of threaded bolts 94, and having a surface 914 that confronts the surface 822 of the bridging portion 82 and that is formed with a threaded hole 913. A threaded fastener 92 includes a threaded shank 921 extending through the curved slot 83 and threadedly engaging the anchoring block 91 at the threaded hole 913, and a washer 93 sleeved on the threaded shank 913. The threaded fastener 92 is operable so as to clamp the retaining plate 80 against the anchoring block 91, thereby arresting pivoting movement of the C-shaped frame 40 relative to the work platform 20.

Preferably, the retaining plate 80 is formed with angle indicia 101 disposed on the surface 821 of the bridging portion 82 adjacent to the curved slot 83. A pointer unit 102 is mounted on the anchoring block 91 for pointing to the angle indicia 101. The pointer unit 102 includes a mounting portion 1021 mounted on top of the anchoring block 91 via a screw 103, and a pointing portion 1024 extending from the mounting portion 1021, over the bridging portion 82, and bent to point at the indicia 101.

Figure 10:
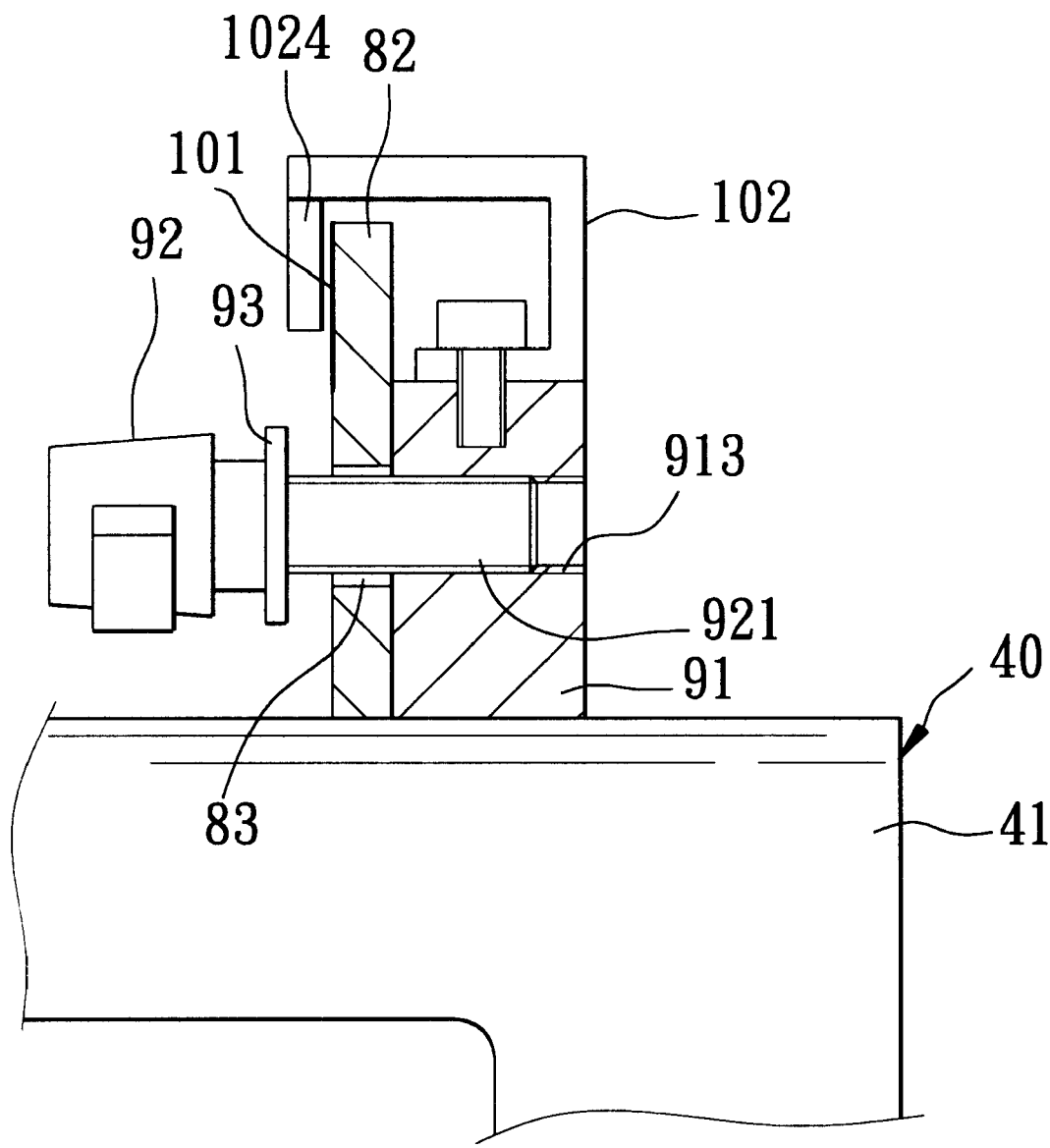
FIG. 10 is a view similar to FIG. 9 but illustrating the locking unit in a releasing state.
Figure 11:
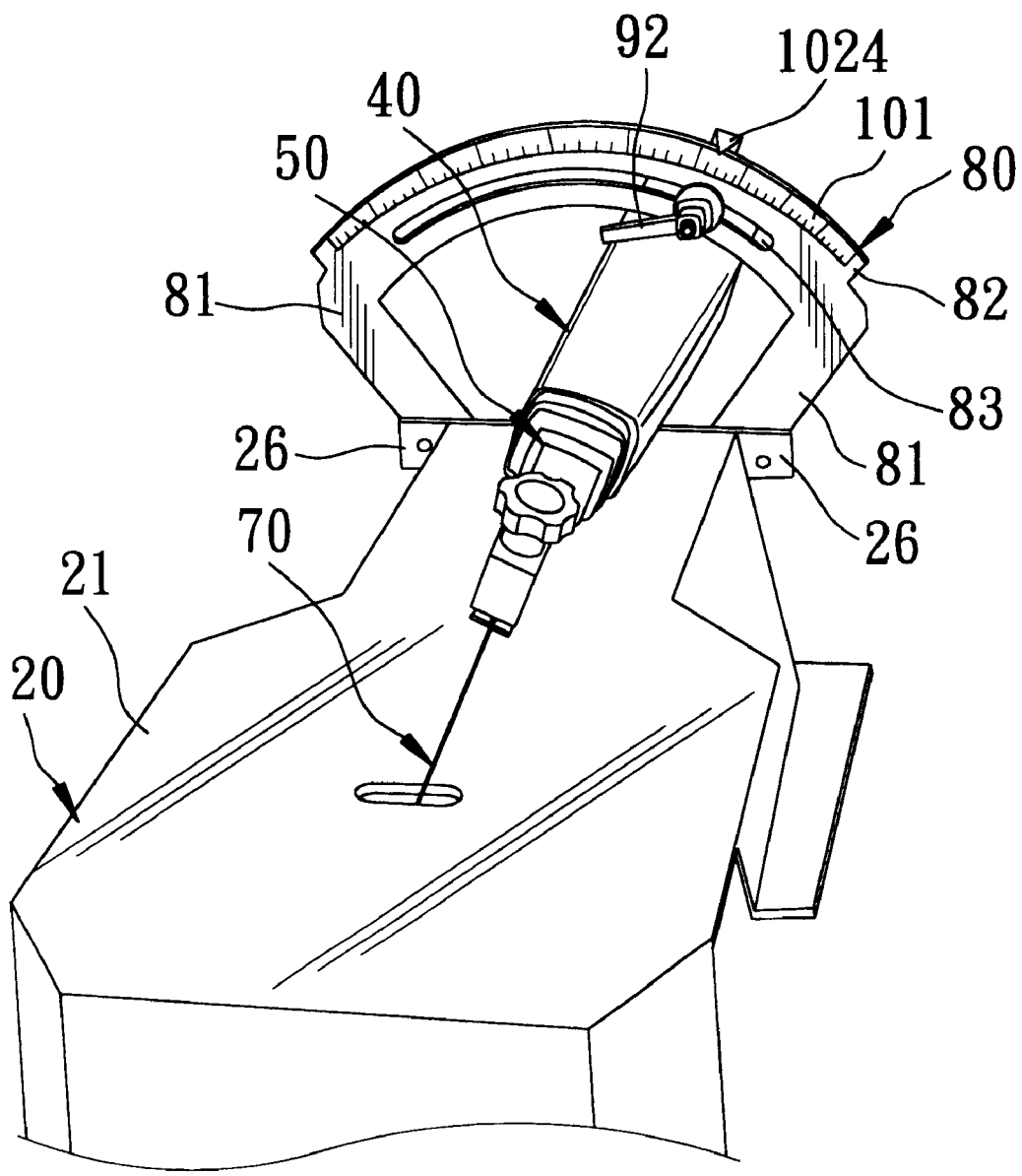
FIG. 11 is a fragmentary front perspective view illustrating how sawing angle is adjusted in the first preferred embodiment.
Figure 12:
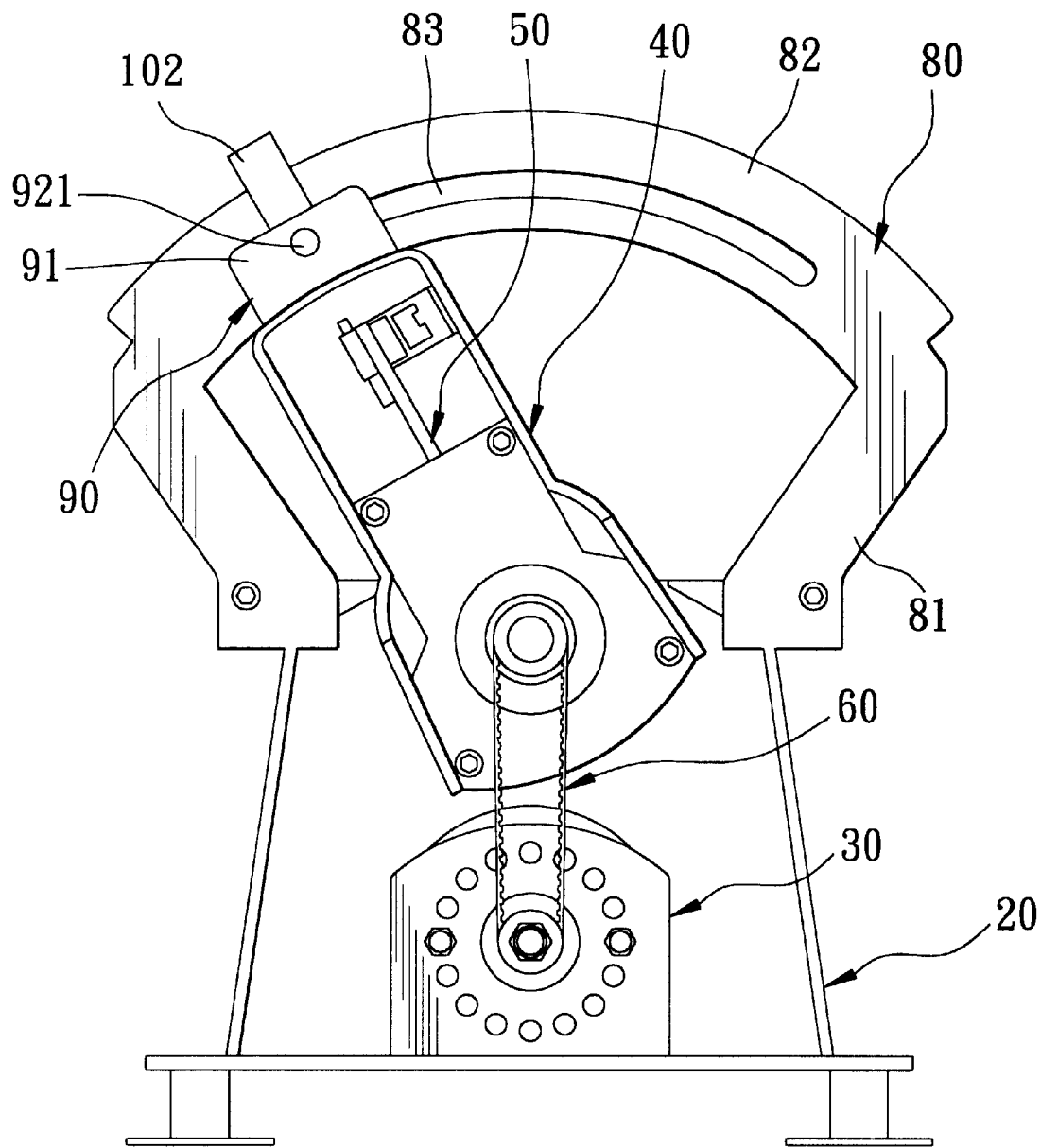
FIG. 12 is a rear schematic view illustrating the C-shaped frame of the first preferred embodiment in a tilted state.

As shown in FIGS. 5 and 9, when the scroll saw is in use, the threaded fastener 92 is tightened to clamp the retaining plate 82 against the anchoring block 91 such that the C-shaped frame 40, the blade holder unit 50 and the blade unit 70 are arrested from pivoting relative to the work platform 20. Referring to FIG. 10, when sawing angle adjustment is desired, the threaded fastener 92 is loosened. Then, as shown in FIGS. 8, 11 and 12, the C-shaped frame 40 is forced to pivot about the first and second pivot pin units 45, 47 and move the blade holder unit 50 and the blade unit 70 simultaneously therewith relative to the work platform 20. During angle adjustment, the threaded shank 921 slides along the curved slot 83 to a desired angle reading on the indicia 101. Upon adjustment to the desired sawing angle, the threaded fastener 92 is tightened such that the C-shaped frame 40, the blade holder unit 50 and the blade unit 70 are once again arrested from pivoting relative to the work platform 20.

Figure 13:
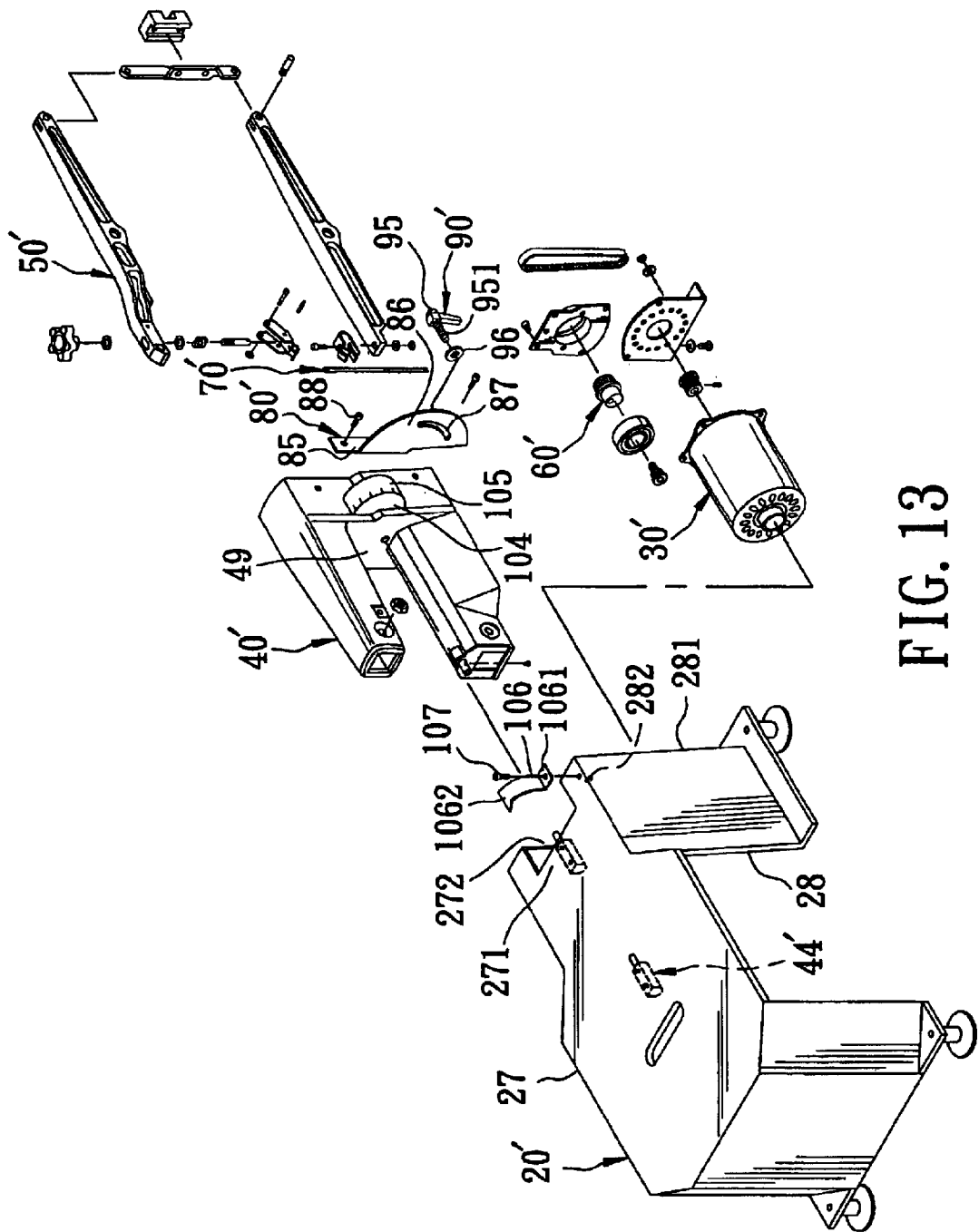
FIG. 13 is an exploded perspective view of the second preferred embodiment of a scroll saw according to the present invention.
Figure 14:
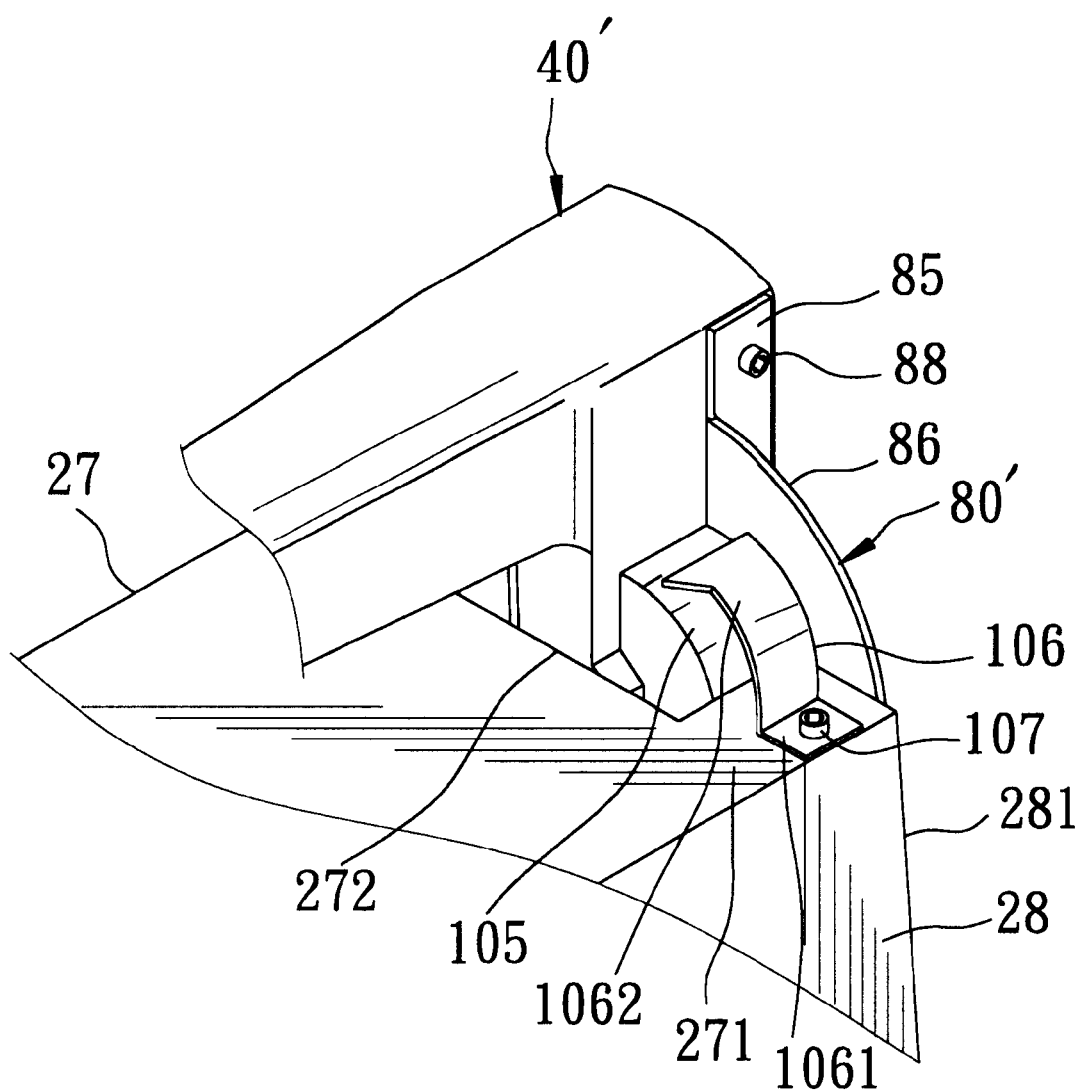
FIG. 14 is a fragmentary assembled perspective view of the second preferred embodiment.
Figure 15:
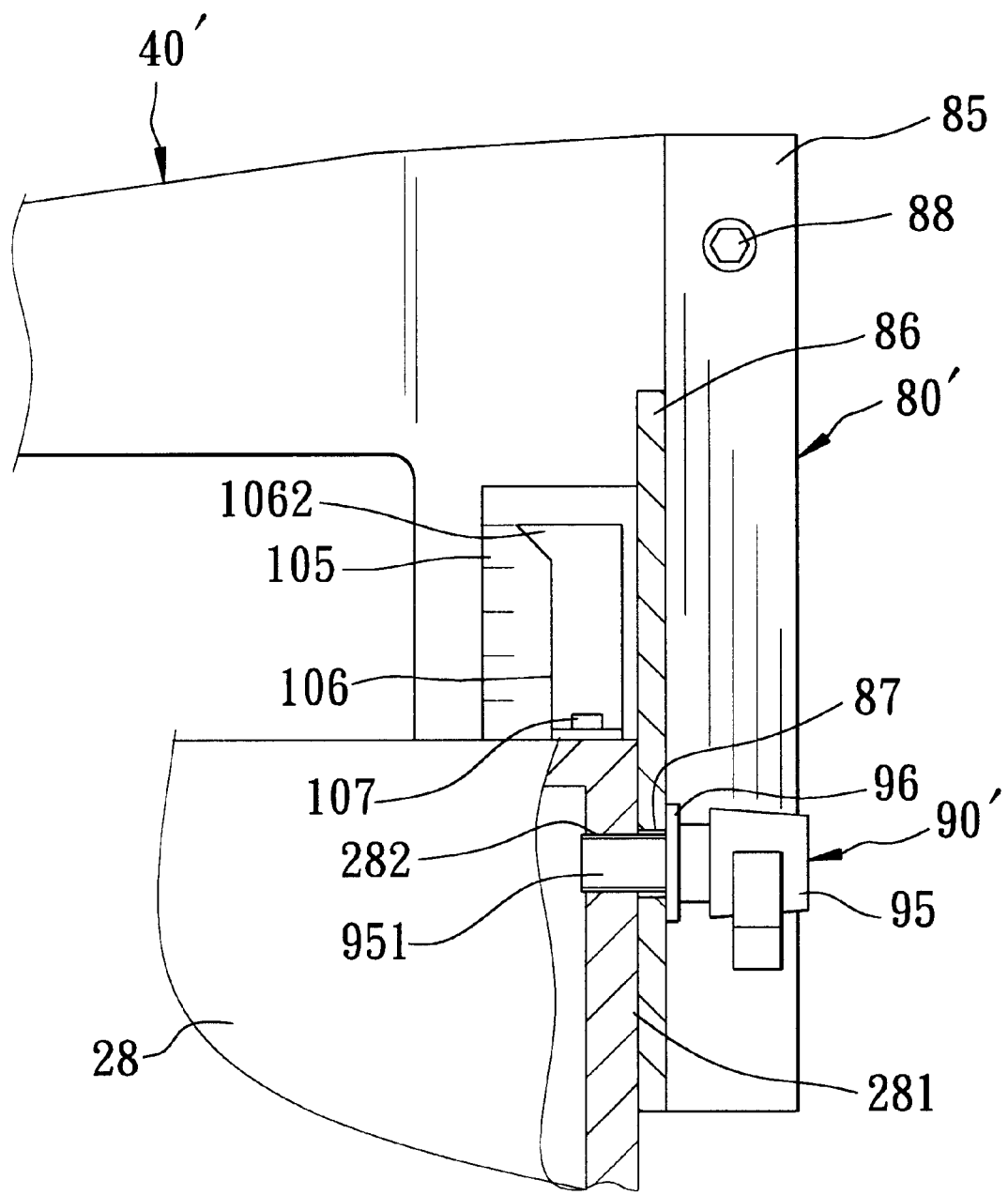
FIG. 15 is a fragmentary partly sectional schematic view of the second preferred embodiment of the present invention for illustrating a locking unit in a clamping state.

Referring to FIGS. 13, 14 and 15, the second embodiment of a scroll saw according to this invention is shown to include a work platform 20', a C-shaped frame 40', a blade unit 70', a blade holder unit 50', a motor unit 30', a transmission unit 60', a pivot unit 44', and a locking unit 90'.

The work platform 20' includes a top plate 27 that is formed with a top side extending and defining a center line and that has a first end 271 formed with a frame retaining notch 272 to engage a connecting frame portion 49 of the C-shaped frame 40'. A lateral plate 28 extends downwardly from a lateral edge of the first end 271 of the top plate 27. The work platform 20' further includes an end plate 281 extending downwardly from an end edge of the first end 271 of the top plate 27 and serving as an anchoring block. The end plate 281 is formed with a threaded hole 282.

The structures and functions of the C-shaped frame 40', the blade unit 70', the blade holder unit 50', the motor unit 30', the transmission unit 60' and the pivot unit 44' are the same as those in the first preferred embodiment and will not be described further for the sake of brevity.

The locking unit 90' includes a retaining plate 80' disposed adjacent to the end plate 281 and having a curved plate portion 86 and a mounting portion 85 mounted on one side of the C-shaped frame 40' via a pair of fasteners 88. The curved plate portion 86 is formed with a curved slot 87 having a curvature centered at the pivot axis defined by the pivot unit 44'. A threaded fastener 95 includes a threaded shank 951 extending through the curved slot 87 and threadedly engaging the threaded hole 282 in the end plate 281. A washer 96 is sleeved on the threaded shank 951. The threaded fastener 95 is operable so as to clamp the retaining plate 80' against the end plate 281, thereby arresting pivoting movement of the C-shaped frame 40' relative to the work platform 20'.

Preferably, the C-shaped frame 40' has a lateral curved extension 104 that is formed with angle indicia 105 and that is disposed adjacent to the curved slot 87 in the retaining plate 80'. A pointer unit 106 is mounted on the work platform 20' for pointing to the angle indicia 105. The pointer unit 106 includes a mounting portion 1061 mounted on top of the work platform 20' via a screw 107, and a pointing portion 1062 extending from the mounting portion 1061 and bent to point at the indicia 105.

When the scroll saw of this embodiment is in use, the threaded fastener 95 is tightened to clamp the retaining plate 80' against the end plate 281 such that the C-shaped frame 40', the blade holder unit 50' and the blade unit 70' are arrested from pivoting relative to the work platform 20'. When sawing angle adjustment is desired, the threaded fastener 95 is loosened. Then, the C-shaped frame 40' is forced to pivot via the pivot unit 44' and move the blade holder unit 50' and the blade unit 70' simultaneously therewith relative to the work platform 20'. During angle adjustment, the threaded shank 951 slides along the curved slot 87 to a desired angle reading on the indicia 105. Upon adjustment to the desired sawing angle, the threaded fastener 95 is tightened such that the C-shaped frame 40', the blade holder unit 50' and the blade unit 70' are once again arrested from pivoting relative to the work platform 20'.

The following are some of the advantages of the scroll saw according to this invention:

1. The locking units 90, 90' are within easy reach, and the indicia 101, 105 are readily visible to the operator of the scroll saw. As such, sawing angle adjustment can be easily and quickly conducted in this invention.
2. Work pieces (not shown) are not tilted and are always disposed flatly on the work platform 20, 20' regardless of the sawing angle. Control of the position of the work piece during the sawing operation can be easily conducted to result in better work quality and efficiency.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A scroll saw comprising;
    a work platform having a top side extending and defining a center line in a longitudinal direction and formed with a blade slot transverse to the longitudinal direction;
    a C-shaped frame having upper and lower frame portions disposed above and below said top side of said work platform, respectively;
    a blade unit passing through said blade slot in said work platform and having upper and lower blade ends;
    a blade holder unit including upper and lower blade holder arms respectively extending above and below said top side of said work platform, and connected to a respective one of said upper and lower blade ends and to a respective one of said upper and lower frame portions;
    a motor unit mounted on said work platform;

a transmission unit interconnecting said motor unit and said blade holder unit to drive said blade holder unit for moving said blade unit to reciprocate relative to said work platform;

a pivot unit for mounting pivotally said C-shaped frame on said work platform about a pivot axis parallel to the center line, thereby permitting sawing angle adjustment; and a locking unit for locking releasable said C-shaped frame to said work platform so as to arrest pivoting movement of said C-shaped frame relative to said work platform, thereby permitting retention of said C-shaped frame at a desired sawing angle;

wherein said work platform includes a top plate formed with said top side, and a pair of lateral plates spaced apart in the transverse direction and extending downwardly from and cooperating with said top plate to form a mounting space thereamong, said lower frame portion and said lower blade holder arm extending into said mounting space;

wherein said C-shaped frame is formed with a pivot hole between said upper and lower frame portions, and said lower frame portion is provided with a pivot sleeve unit aligned with said pivot hole along the pivot axis;

said pivot unit including first and second pivot pin units mounted on a bottom side of said top plate, said first and second pivot pin units being aligned in the longitudinal direction and being spaced apart from each other in the longitudinal direction, said pivot hole in said C-shaped frame pivotally engaging said first pivot pin unit, said pivot sleeve unit on said lower frame portion pivotally engaging said second pivot pin unit.

2. The scroll saw as claimed in claim 1, wherein said second pivot pin unit is formed with an annular groove, said pivot sleeve unit is formed with a radial fastener hole registered with said annular groove, and said pivot unit further includes a fastener engaging said fastener hole and extending into said annular groove to arrest movement of said C-shaped frame in the longitudinal direction relative to said work platform.

3. A scroll saw comprising;

a work platform having a top side extending and defining a center line in a longitudinal direction and formed with a blade slot transverse to the longitudinal direction;

a C-shaped frame having upper and lower frame portions disposed above and below said top side of said work platform, respectively;

a blade unit passing through said blade slot in said work platform and having upper and lower blade ends;

a blade holder unit including upper and lower blade holder arms respectively extending above and below said top side of said work platform, and connected to a respective one of said upper and lower blade ends and to a respective one of said upper and lower frame portions;

a motor unit mounted on said work platform;

a transmission unit interconnecting said motor unit and said blade holder unit to drive said blade holder unit for moving said blade unit to reciprocate relative to said work platform;

a pivot unit for mounting pivotally said C-shaped frame on said work platform about a pivot axis parallel to the center line, thereby permitting sawing angle adjustment; and a locking unit for locking releasable said C-shaped frame to said work platform so as to arrest pivoting movement of said C-shaped frame relative to said work platform, thereby permitting retention of said C-shaped frame at a desired sawing angle;

wherein said locking unit includes:

a generally inverted U-shaped retaining plate having a pair of mounting arms disposed on opposite sides of said C-shaped frame and secured to said work platform, and a curved bridging portion interconnecting said mounting arms and disposed above said upper frame portion, said bridging portion being formed with a curved slot having a curvature centered at the pivot axis;

an anchoring block mounted on said upper frame portion adjacent to said bridging portion of said retaining plate; and a threaded fastener extending through said curved slot and threadedly engaging said anchoring block, said threaded fastener being operable so as to clamp said retaing plate against said anchoring block, thereby arresting pivoting movement of said C-shaped frame relative to said work platform.

4. The scroll saw as claimed in claim 3, wherein said retaining plate is formed with angle indicia adjacent to said curved slot, said anchoring block being provided with a pointer for pointing to said angle indicia.

5. A scroll saw comprising;

a work platform having a top side extending and defining a center line in a longitudinal direction and formed with a blade slot transverse to the longitudinal direction;

a C-shaped frame having upper and lower frame portions disposed above and below said top side of said work platform, respectively;

a blade unit passing through said blade slot in said work platform and having upper and lower blade ends;

a blade holder unit including upper and lower blade holder arms respectively extending above and below said top side of said work platform, and connected to a respective one of said upper and lower blade ends and to a respective one of said upper and lower frame portions;

a motor unit mounted on said work platform;

a transmission unit interconnecting said motor unit and said blade holder unit to drive said blade holder unit for moving said blade unit to reciprocate relative to said work platform;

a pivot unit for mounting pivotally said C-shaped frame on said work platform about a pivot axis parallel to the center line, thereby permitting sawing angle adjustment; and a locking unit for locking releasably said C-shaped frame to said work platform so as to arrest pivoting movement of said C-shaped frame relative to said work platform, thereby permitting retention of said C-shaped frame at a desired sawing angle;

wherein said locking unit includes:

a retaining plate mounted on one side of said C-shaped frame portion and formed with a curved slot having a curvature centered at the pivot axis;

an anchoring block provided on said work platform and disposed adjacent to said retaining plate; and a threaded fastener extending through said curved slot and threadedly engaging said anchoring block, said threaded fastener being operable so as to clamp said retaining plate against said anchoring block, thereby arresting pivoting movement of said C-shaped frame relative to said work platform.

6. The scroll saw as claimed in claim 5, wherein said C-shaped frame is formed with angle indicia adjacent to said curved slot in said retaining plate, said work platform being provided with a pointer for pointing to said angle indicia.

* * * * *